Patented Feb. 25, 1947

2,416,386

UNITED STATES PATENT OFFICE 2,416,386

PROCESS FOR MAKING PHTHALOCYANINES CONTAINING —SH GROUPS

Norman Hulton Haddock and Clifford Wood, Blackley, Manchester, England, assignors to Imperial Chemical Industries Limited, a corporation of Great Britain No Drawing. Application June 21, 1944, Serial No. 541,455. In Great Britain July 7, 1943

6 Claims. (Cl. 260—314.5)

The present invention relates to the manufacture of new dyestuffs and more particularly to the manufacture of new sulphur-containing dyestuffs.

We have found that when a copper phthalocyanine tetra-(4)-sulphonyl chloride is heated with benzyl mercaptan, the colour of the mixture, which is blue, changes to green and water and hydrogen chloride are evolved. From the product dibenzyl disulphide can be extracted with alcohol, a bright green residue being left. This green residue will dissolve in dilute sodium hydroxide solution which has previously been boiled with a trace of sodium sulphide to remove dissolved oxygen. Accordingly the reaction which takes place may be regarded as the reduction of the copper phthalocyanine tetra-(4)-sulphonyl chloride to the corresponding mercaptan by the benzyl mercaptan, the latter becoming itself simultaneously oxidised to dibenzyl disulphide. This statement is however only to be considered as a theory which may or may not be correct. The aforesaid bright green residue, which is possibly therefore copper tetra-(4)-mercaptophthalocyanine, will dissolve also in aqueous sodium sulphide solution to give a bluish grey solution of similar appearance to that obtained by dissolving it in sodium hydroxide solution. When the solution in either of these solvents is applied to cotton fabric, the latter assumes a greyish hue, which is converted by atmospheric oxidation to bright green. The green product referred to behaves in a similar manner to a sulphur dyestuff inasmuch as it dissolves in aqueous sodium sulphide, yielding a solution which can be used for dyeing by the customary technique employed in connection with sulphur dyestuffs. In place of copper phthalocyanine tetra-(4)-sulphonyl chloride other phthalocyanine sulphonyl chlorides may be used; likewise the benzyl mercaptan can be replaced by other mercaptans.

Accordingly the present invention relates to a process for the manufacture of sulphur-containing dyestuffs comprising heating a metal or metal-free phthalocyanine sulphonyl chloride with an alkyl, aralkyl, or aryl mercaptan.

As phthalocyanine sulphonyl chlorides there may be used in accordance with the present invention, for example, besides copper phthalocyanine tetra-(4)-sulphonyl chloride, copper phthalocyanine tri-(4)-sulphonyl chloride and metal-free phthalocyanine tri-sulphonyl chloride.

By way of mercaptan there can be employed in the present invention besides benzyl mercaptan, also p-thiocresol, thio-β-naphthol, 2-mercapto-benzthiazole, m-dimercaptobenzene and 4-mercaptophthalic anhydride, for instance. It will be noted that all the aforegoing mercaptans are either liquid or melt to form liquids at the temperature of the reaction. The latter, as will be seen from the following examples may be as high as 180° C.

The present dyestuffs yield dyeings on cotton of blue to green shades, which possess good fastness properties particularly good fastness to wet treatment.

The following examples in which the parts are by weight illustrate, but do not limit, the invention.

Example 1

10 parts of copper phthalocyanine tetra-(4)-sulphonyl chloride obtainable by heating tetrapotassium copper phthalocyanine tetra-(4)-sulphonate with phosphorus pentachloride in nitrobenzene, are heated with 50 parts of benzyl mercaptan at 170–180° C. for one hour. The mixture is cooled to 90° C., diluted with 200 parts of alcohol, filtered, and the residue washed with 500 parts of hot alcohol and finally with water. The bright green product dissolves in hot dilute aqueous sodium sulphide solution yielding a bluish grey solution from which cotton is dyed in grey to black shades, which on exposure to the air produce bright green dyeings of good fastness to washing, soap boiling, chemick and light.

In place of the 50 parts of benzyl mercaptan used above, there are employed with similar results 50 parts of 2-mercaptobenthiazole.

Example 2

5 parts of copper phthalocyanine tetra-(4)-sulphonyl chloride, obtainable as described in Example 1, are heated with 25 parts of p-thiocresol at 170–175° C. for 2 hours. The melt is diluted with 100 parts of alcohol and the green sediment filtered off and washed with 300 parts of alcohol. The product after drying is a bright green powder which dissolves in hot dilute aqueous sodium sulphide solution, giving a bluish grey solution from which cotton is dyed in grey or black shades, which oxidise in air to bright green.

Example 3

5 parts of metal-free phthalocyanine trisulphonyl chloride (obtainable by heating with phosphorus pentachloride in nitrobenzene trisodium metal-free phthalocyanine trisulphonate, itself got by sulphonating metal-free phthalocyanine), are heated with 20 parts of benzyl mercaptan at 170–175° C. for 2 hours. The mixture is cooled to 90° C., diluted with 100 parts of alcohol, filtered and the residue washed with 500 parts of hot alcohol and finally with water. The bright yellowish green product dissolves in hot dilute sodium sulphide solution, giving a bluish grey solution from which cotton is dyed in grey shades, which oxidises in air to bright yellowish green.

*Example 4*

9 parts of metal-free phthalocyanine trisulphonyl chloride (obtainable as descrbied in Example 3) are heated with 60 parts of dodecyl mercaptan at 175–180° C. for 1 hour. The mixture, which is green, is cooled to 80° C. and diluted with 200 parts of benzene. The suspension is filtered and the filter-cake washed three times with 50 parts of benzene and dried. A new dyestuff, which dyes cotton similarly to that of Example 3, is obtained.

*Example 5*

10 parts of metal-free phthalocyanine trisulphonyl chloride (obtainable as described in Example 3) are heated with 50 parts of m-dimercaptobenzene at 120–125° C. for ¼ hour. The green mixture is cooled to 80° C. and diluted with 200 parts of alcohol. The suspension is filtered, and the filter-cake washed three times with 50 parts of alcohol, and dried. A new dyestuff which dyes cotton similarly to that of Example 3 is obtained.

We claim:

1. Process for the manufacture of sulphur-containing dyestuffs of the phthalocyanine series, which comprises heating, at a temperature of at least 120° C., a phthalocyanine compound selected from the group consisting of metal- and metal-free phthalocyanines containing sulphonyl-chloride groups, with an organic mercaptan which is liquid at the selected reaction temperature, until the sulphonyl-chloride groups of the original phthalocyanine compound have been converted into mercapto groups.

2. Process for the manufacture of sulphur-containing dyestuffs of the phthalocyanine series, which comprises heating, at a temperature between 120° and 180° C., a phthalocyanine compound selected from the group consisting of metal- and metal-free phthalocyanines containing sulphonyl-chloride groups, with an organic mercaptan which is liquid at the reaction temperature, until the sulphonyl-chloride groups of the phthalocyanine compound have been converted into SH groups.

3. Process for the manufacture of sulphur colors of the phthalocyanine series, which comprises heating at a temperature of 120° to 180° C., a copper-phthalocyanine polysulphonyl chloride with an organic mercaptan which is liquid at the reaction temperature, until the sulphonyl-chloride groups of the original phthalocyanine compound have been converted into mercapto groups.

4. Process for the manufacture of sulphur colors of the phthalocyanine series, which comprises heating at a temperature of 120° to 180° C., a metal-free phthalocyanine polysulphonyl chloride with an organic mercaptan which is liquid at the reaction temperature, until the sulphonyl-chloride groups of the original phthalocyanine compound have been converted into mercapto groups.

5. Process for the manufacture of sulfur colors of the phthalocyanine series, which comprises heating metal-free-phthalocyanine-trisulphonyl chloride with benzyl mercaptan at a temperature of about 170° to 175° C., and recovering from the reaction mass a phthalocyanine coloring matter which is soluble in aqueous sodium sulfide and in aqueous sodium hydroxide.

6. Process for the manufacture of sulfur colors of the phthalocyanine series, which comprises heating metal-free-phthalocyanine-trisulphonyl chloride with dodecyl mercaptan at a temperature of about 175° to 180° C., and recovering from the reaction mass a phthalocyanine coloring matter which is soluble in aqueous sodium sulfide and in aqueous sodium hydroxide.

NORMAN HULTON HADDOCK.
CLIFFORD WOOD.

REFERENCES CITED

The following references are of record in the file of this patent:

UNITED STATES PATENTS

| Number | Name | Date |
|---|---|---|
| 2,182,763 | Muehlbauer | Dec. 5, 1939 |
| 2,219,330 | Madler et al. | Oct. 29, 1940 |
| 2,342,662 | Haddock | Feb. 29, 1944 |

FOREIGN PATENTS

| Number | Country | Date |
|---|---|---|
| 492,177 | British | Sept. 15, 1938 |